US008149471B2

(12) United States Patent
Kawai

(10) Patent No.: US 8,149,471 B2
(45) Date of Patent: *Apr. 3, 2012

(54) IMAGE READING APPARATUS, IMAGE READING METHOD AND IMAGE READING PROGRAM FOR CROSS-TALK NOISE REDUCTION

(75) Inventor: Koji Kawai, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1017 days.

This patent is subject to a terminal disclaimer.

(21) Appl. No.: 12/055,837

(22) Filed: Mar. 26, 2008

(65) Prior Publication Data

US 2009/0244647 A1    Oct. 1, 2009

(51) Int. Cl.
*H04N 1/38* (2006.01)
*G06K 7/00* (2006.01)

(52) U.S. Cl. ........ 358/463; 358/1.9; 358/1.15; 358/443; 358/446; 358/461; 358/465; 358/471; 358/474; 358/476; 358/477; 358/480; 358/482; 358/505; 358/521; 358/525; 358/528; 382/167; 382/274; 382/295; 382/296; 382/312; 399/32; 399/36; 399/81; 399/188; 399/202; 399/211; 399/212; 347/235; 347/234; 347/248; 347/249; 347/250

(58) Field of Classification Search .................. 358/461, 358/443, 445, 446, 447, 448, 465, 471, 474, 358/475, 476, 477, 480, 463; 382/275
See application file for complete search history.

(56) References Cited

U.S. PATENT DOCUMENTS

| 6,438,276 B1 * | 8/2002 | Dhuse et al. ................. 382/312 |
| 7,072,075 B2 * | 7/2006 | Kondo et al. .................. 358/1.9 |
| 7,961,361 B2 * | 6/2011 | Kawai .......................... 358/474 |

FOREIGN PATENT DOCUMENTS

JP    2003-169190    6/2003

* cited by examiner

*Primary Examiner* — Steven Kau
(74) *Attorney, Agent, or Firm* — Turocy & Watson, LLP

(57) ABSTRACT

An image reading apparatus in which cross-talk noise occurring between plural reading units is reduced, an image reading method and an image reading program are provided. There are included plural reading units that respectively operate at different timings, a noise calculation unit that acquires first read data as a result of reading of a first read object as the read object by the plural reading units, acquires an operation state of the plural reading units during the reading of the first read object, and calculates, based on the operation state and the first read data obtained in the operation state, noise information based on the operation state, and a noise removal unit that acquires second read data as a result of reading of a second read object as the read object different from the first read object by the plural reading units, and removes noise from the second read data based on the noise information calculated by the noise calculation unit.

17 Claims, 17 Drawing Sheets

| ORIGINAL DOCUMENT IMAGE | IMAGE A | IMAGE B |
|---|---|---|
|  |  |  |
|  |  |  |
| PROFILE OF ORIGINAL DOCUMENT IMAGE IN SUB-SCANNING DIRECTION | PROFILE OF IMAGE A IN SUB-SCANNING DIRECTION | PROFILE OF IMAGE B IN SUB-SCANNING DIRECTION |

IMAGE OF
WHITE REFERENCE DATA

IMAGE OF
BLACK REFERENCE DATA

PROFILE OF WHITE REFERENCE
DATA IN SUB-SCANNING DIRECTION

PROFILE OF BLACK REFERENCE
DATA IN SUB-SCANNING DIRECTION

IMAGE BEFORE SHADING
CORRECTION PROCESSING

IMAGE AFTER SHADING
CORRECTION PROCESSING

PROFILE IN SUB-SCANNING
DIRECTION BEFORE SHADING
CORRECTION PROCESSING

PROFILE IN SUB-SCANNING
DIRECTION AFTER SHADING
CORRECTION PROCESSING

FIG.10

| Ra | Rb |
|---|---|
| Line1 | Line1 |
| Line2 | EMPTY SENDING |
| Line3 | Line3 |
| Line4 | EMPTY SENDING |
| Line5 | Line5 |
| Line6 | EMPTY SENDING |
| Line7 | Line7 |
| Line8 | EMPTY SENDING |
| Line9 | Line9 |
| Line10 | EMPTY SENDING |
| Line11 | Line11 |
| Line12 | EMPTY SENDING |
| Line13 | Line13 |
| Line14 | EMPTY SENDING |
| Line15 | Line15 |
| Line16 | EMPTY SENDING |

Line16:Ra

| Ra(1) | Ra(1) | ... | Ra(N-1) | Ra(N) |
|---|---|---|---|---|

AMOUNT OF CROSS-TALK NOISE OF Ra $$\alpha(n) = \frac{NRa(n) - DRa(n)}{NRb(n) - DRb(n)}$$

IMAGE AFTER SHADING CORRECTION
PROCESSING

PROFILE IN SUB-SCANNING DIRECTION
AFTER SHADING CORRECTION PROCESSING

PRIOR ART

PRIOR ART

IMAGE READING APPARATUS, IMAGE READING METHOD AND IMAGE READING PROGRAM FOR CROSS-TALK NOISE REDUCTION

BACKGROUND OF THE INVENTION

1. Field of the Invention

The present invention relates to an image reading apparatus in which a read result is corrected, an image reading method and an image reading program.

2. Description of the Related Art

First, a structure of a mechanical system of a related art image reading apparatus will be described.

FIG. 14 is a block diagram showing an example of the structure of the mechanical system of the related art image reading apparatus. The mechanical system of the image reading apparatus includes a first carriage 2, a second carriage 3, a condensing lens 4, a one-dimensional image sensor device 5, an original document table glass 6, a platen cover 7, an illumination device 8, and mirrors 9, 10 and 11.

An original document is placed on the original document table glass 6 so that the original document writing surface faces the original document table glass 6 side, and the platen cover 7 is closed so that the original document is pressed to the original document table glass 6. When the original document is irradiated by lighting of the illumination device 8, reflected light from the original document is focused on the one-dimensional image sensor device 5 through the mirrors 9, 10 and 11 and the condensing lens 4.

The first carriage 2 including the illumination device 8 and the mirror 9 and the second carriage 3 including the mirrors 10 and 11 are moved by a not-shown carriage drive motor in synchronization with a read timing signal, so that sub-scanning of the original document is performed.

With respect to the original document, a pixel line is outputted at each read timing signal by the one-dimensional image sensor device 5 so that main scanning is performed, and the first carriage 2 and the second carriage 3 are moved so that the sub-scanning is performed. The intensity of the reflected light during the scanning is photoelectric converted by the one-dimensional image sensor device 5, and is outputted as an analog electric signal.

First, a structure of an electrical system of the related art image reading apparatus will be described.

FIG. 15 is a block diagram showing an example of the structure of the electrical system of the related art image reading apparatus. In this drawing, the same reference numeral as that of FIG. 14 denotes the same or equivalent part to that shown in FIG. 14, and its explanation will be omitted here. The electrical system of the image reading apparatus includes a one-dimensional image sensor device 5, an illumination device 8, an analog processing circuit 12, an A/D converter 13, a shading correction circuit 14, a page memory 15, an image processing circuit 16, a timing generation circuit 17, a CPU (Central Processing Unit) 18, a control panel 19, a memory 20, a mechanical system drive circuit 21, an illumination device control circuit 22, and an external interface circuit 23. The external interface circuit 23 is connected to an external apparatus.

The external apparatus is, for example, a storage apparatus such as a hard disk, a flash memory or an optical disk apparatus, a PC (Personal Computer), a printer or the like. Incidentally, the foregoing storage apparatus may be incorporated in the image reading apparatus.

The control panel 19 receives setting information from a user, and sends it to the CPU 18. The mechanical system drive circuit 21 is for driving the mechanism for sub-scanning, such as the first carriage 2 and the second carriage 3. The illumination device control circuit 22 controls the turning on and off of the illumination device 8.

The CPU 18 uses the memory 20 as a working memory, and operates in accordance with a program and data stored in the memory 20. Besides, the CPU 18 controls the timing generation circuit 17, the control panel 19, the mechanical system drive circuit 21, the illumination device control circuit 22, the shading correction circuit 14, and the external interface circuit 23. In accordance with instructions from the CPU 18, the timing generation circuit 19 sends timing signals, such as read timing signals, to the one-dimensional image sensor device 5, the analog processing circuit 12, the A/D converter 13, the shading correction circuit 14, and the page memory 15, and causes the respective parts to perform synchronous operations.

An analog electric signal of an image obtained by the one-dimensional image sensor device 5 is inputted to the analog processing circuit 12, and a pre-processing of A/D conversion is performed. Here, the analog processing circuit 12 includes a circuit to perform the pre-processing such as CDS (Correlated Double Sampling) or sample hold, analog electric signal amplification, or offset removal. The analog electric signal pre-processed by the analog processing circuit 12 is converted into a digital electric signal by the A/D converter 13, and is sent to the shading correction circuit 14.

The shading correction circuit 14 performs a shading correction processing on the digital electric signal to correct sensitivity variation between each main-scanning pixel in the one-dimensional image sensor device 5, uneven illumination of the illumination device 8 (especially in the main scanning direction) or the like, and stores the result thereof as correction data into the page memory 15. The shading correction circuit 14 may send the correction data directly to the image processing circuit 16.

The image processing circuit 16 performs an image processing according to an instruction received from the external interface circuit 23 on the correction data read out from the page memory 15, and sends output data as the result of the processing to the external apparatus through the external interface circuit 23. For example, in the case where the image reading apparatus is an image scanner, the image processing circuit 16 outputs the output data which the external PC or printer can use. Besides, for example, in the case where the image reading apparatus 1 is mounted in a copier, the image processing circuit 16 outputs the output data for driving an optical system so as to form a latent image on a photoconductive drum. The external interface circuit 23 receives the instruction of reading from the external apparatus, sends it to the image processing circuit 16, and sends the output data from the image processing circuit 16 to the external apparatus.

Next, the outline of an operation of image reading processing by the related art image reading apparatus will be described.

First, in the control panel 19, setting information is inputted by the user. The setting information is the setting of, for example, an operation mode (color mode, monochrome mode, etc.) in reading of an image, a reading resolution, a document size or the like. The setting information inputted to the control panel 19 is acquired by the CPU 18. The CPU 18 sends control signals to the respective parts based on the setting information. Next, when an image reading start instruction (start button) is inputted in the control panel 19, the CPU 18 starts the image reading processing.

FIG. 16 is a flowchart showing an example of the operation of the related art image reading processing. First, before reading of an original document image, the image reading apparatus performs a shading correction preparation processing to acquire reference data (black reference data and white reference data) used for a shading correction processing (S111 to S114). Here, a reading position (the first carriage 2) exists at an initial position. First, the CPU 18 turns off the illumination device 8 (S111). Next, the CPU 18 instructs the mechanical system drive circuit 21 to move the reading position from the initial position to a position just below a reference plate (first read object), causes the one-dimensional image sensor device 5 to read the reference plate in the turning-off state, acquires the read data for plural lines in the state where the reflectivity is close to 0 and makes it the black reference data (S112). Here, the reference plate is provided at, for example, a position adjacent to the original document position.

Next, the CPU 18 turns on the illumination device 8 (S113). Next, the CPU 18 instructs the mechanical system drive circuit 21 to move the reading position to the position just below the reference plate, causes the one-dimensional image sensor device 5 to read the reference plate in the turning-on state, acquires read data at known high reflectivity for plural lines and makes it the white reference data (S114).

Next, the image reading apparatus performs an original document image reading processing to read an original document image (second read object) (S115 to S116). Here, the CPU 18 instructs the mechanical system drive circuit 21 to move the read position to the original document position, the one-dimensional image sensor device 5 reads the original document, and the shading correction circuit 14 performs the shading correction processing on the image read by the shading correction circuit 14, so that the correction data is acquired (S115).

Here, the CPU 18 instructs the mechanical system drive circuit 21 to move the first carriage 2 and the second carriage 3, and when the first carriage 2 reaches the leading edge (left edge in the drawing) of the original document, the CPU 18 performs sub-scanning, and successively outputs the output data outputted from the image processing circuit 16 to the external apparatus through the external interface circuit 23. In the sub-scanning, the first carriage 2 and the second carriage 3 move from the left to the right in FIG. 14 at speeds of (speed of the first carriage 2):(speed of the second carriage 3)=2:1 so that the light path length always becomes constant.

Thereafter, the sub-scanning is continued, and when it reaches the trailing edge of the original document corresponding to the original document size in the setting information, the CPU 18 stops the output of the output data to the external apparatus, sends an instruction to reverse the moving direction of the first carriage 2 and the second carriage 3 to the mechanical system drive circuit 21, and sends an instruction to turn off the illumination device 8 to the illumination device control circuit 22. Here, in the case where the carriage drive motor is a pulse motor such as a stepping motor, the original document size is managed by the number of pulses, and the amount of movement is controlled.

When it is detected by a not-shown optical position sensor that the first carriage 2 and the second carriage 3 moving in the opposite direction to the sub-scanning reach the initial position, an instruction to stop the first carriage 2 and the second carriage 3 is sent to the mechanical system drive circuit 21, the read position is returned to the initial position (S116), and this flow is ended. In the case where the image reading start instruction is inputted in the control panel 19 during the image reading processing, the foregoing image reading processing is again executed after the image reading processing.

Next, the shading correction circuit 14 will be described.

FIG. 17 is a block diagram showing an example of a structure of the related art shading correction circuit. The shading correction circuit 14 includes a selector 141, an averaging circuit 142, a memory selector 143, a black reference storage memory 144, a white reference storage memory 145, and a shading correction arithmetic circuit 146.

In the foregoing processing S112, the selector 141 selects an output destination in accordance with the instruction from the CPU 18, and outputs the read data acquired by the one-dimensional image sensor device 5 to the averaging circuit 142. In order to reduce the influence of random noise, the averaging circuit 142 performs an averaging processing of output of the one-dimensional image sensor device 5 for plural lines. The memory selector 143 selects an output destination in accordance with the instruction from the CPU 18, and stores the black reference data subjected to the averaging processing into the black reference storage memory 144.

In the foregoing processing S114, similarly to the black reference data, the white reference data is subjected to the averaging processing by the averaging circuit 142. The memory selector 143 selects an output destination in accordance with the instruction from the CPU 18, and stores the white reference data subjected to the averaging processing into the white reference storage memory 145.

In the foregoing processing S115, the selector 141 selects an output destination in accordance with the instruction from the CPU 18, and outputs the original document read data as the read data of the original document image acquired by the one-dimensional image sensor device 5 to the shading correction arithmetic circuit 146. The shading correction arithmetic circuit 146 performs a processing to normalize (original document read data black reference data) by (white reference data–black reference data) with respect to each pixel in the main scanning direction. For example, in the case where correction data after the shading correction processing has a resolution of 8 bits, correction data IMG_SHD(n) of the nth pixel in the main scanning direction after the shading correction processing is expressed by the following expression:

$$IMG\_SHD(n)=255\times(IMG(n)-\text{ref\_Black}(n))/(\text{ref\_White}(n)-\text{ref\_Black}(n)).$$

Here, IMG(n) denotes the original document read data of the nth pixel in the main scanning direction, ref_Black(n) denotes the black reference data of the nth pixel in the main scanning direction, and ref_White(n) denotes the white reference data of the nth pixel in the main scanning direction.

FIG. 18 is a graph showing an effect of the related art shading correction processing. The horizontal axis indicates the pixel number in the main scanning direction, and the vertical axis indicates the luminance. The data indicates the original document read data before the shading correction processing and the correction data after the shading correction processing. In the original document image, the region of the pixel numbers 5000 to 5800 has a high density, and the other region has a low density. According to this drawing, it is understood that as compared with the original document read data before the shading correction processing, in the correction data after the shading correction processing, the sensitivity variation between each pixel in the main scanning direction in the one-dimensional image sensor device 5, and the uneven illumination of the illumination apparatus 8 are corrected.

Incidentally, as a related art technique relevant to the invention, there is an image reading apparatus in which plural light receiving element arrays are arranged in the sub-scanning direction, and the respective light receiving element arrays perform reading at different timings, so that the resolution in the sub-scanning direction is improved (see, for example, patent document 1).

However, in the case where the image reading apparatus includes plural light receiving element arrays as in the patent document 1, read data outputted from a specific light receiving element array is added with noise due to the influence of operation of another light receiving element array. Hereinafter, this noise is called cross-talk noise.
Patent Document 1
JP-A-2004-289289

SUMMARY OF THE INVENTION

It is an object of an embodiment of the invention to provide an image reading apparatus in which cross-talk noise occurring between plural light receiving element arrays is reduced, an image reading method and an image reading program.

In order to solve the foregoing problem, according to an aspect of the invention, there are included plural reading units that read a read object, output a result of reading as read data including plural pixels, and respectively operate at different timings, a noise calculation unit that acquires first read data as a result of reading of a first read object as the read object by the plural reading units, acquires an operation state of the plural reading units during the reading of the first read object, and calculates, based on the operation state and the first read data obtained in the operation state, noise information based on the operation state, and a noise removal unit that acquires second read data as a result of reading of a second read object as the read object different from the first read object by the plural reading units, and removes noise from the second read data based on the noise information calculated by the noise calculation unit.

Besides, according to another aspect of the invention, there are executed a first read step of operating, at different timings, plural reading units that read a read object and output it as read data, acquiring first read data as a result of reading of a first read object as the read object by the plural reading units, and acquiring an operation state of the plural reading units during the reading of the first read object, a noise calculation step of calculating, based on the operation state and the first read data obtained in the operation state, noise information based on the operation state, a second read step of operating the plural reading units at different timings and acquiring second read data as a result of reading of a second read object as the read object different from the first read object by the plural reading units, and a noise removal step of removing noise from the second read data based on the noise information calculated at the noise calculation step.

Besides, according to another aspect of the invention, a computer is caused to execute a first read step of operating, at different timings, plural reading units that read a read object and output it as read data, acquiring first read data as a result of reading of a first read object as the read object by the plural reading units, and acquiring an operation state of the plural reading units during the reading of the first read object, a noise calculation step of calculating, based on the operation state and the first read data obtained in the operation state, noise information based on the operation state, a second read step of operating the plural reading units at different timings and acquiring second read data as a result of reading of a second read object as the read object different from the first read object by the plural reading units, and a noise removal step of removing noise from the second read data based on the noise information calculated at the noise calculation step.

DESCRIPTION OF THE DRAWINGS

FIG. 10 is a block diagram showing an example of an arrangement of read data in a memory according to the embodiment.

DESCRIPTION OF THE EMBODIMENTS

Hereinafter, embodiments of the invention will be described with reference to the drawings.

Figure 1:
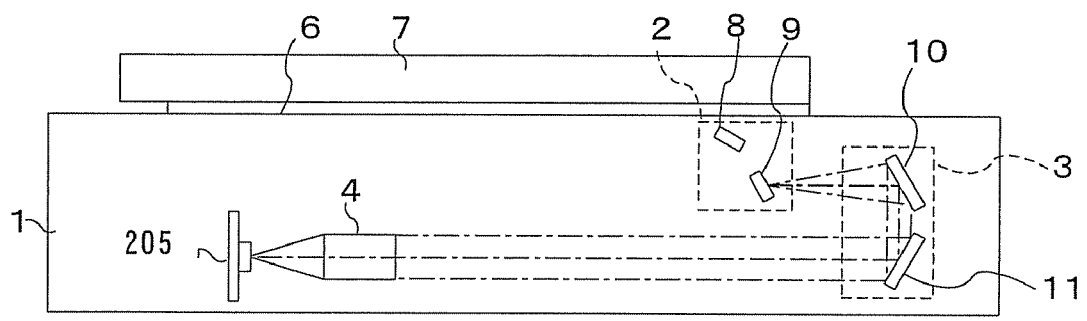
FIG. 1 is a block diagram showing an example of a structure of a mechanical system of an image reading apparatus of an embodiment.
Figure 14:
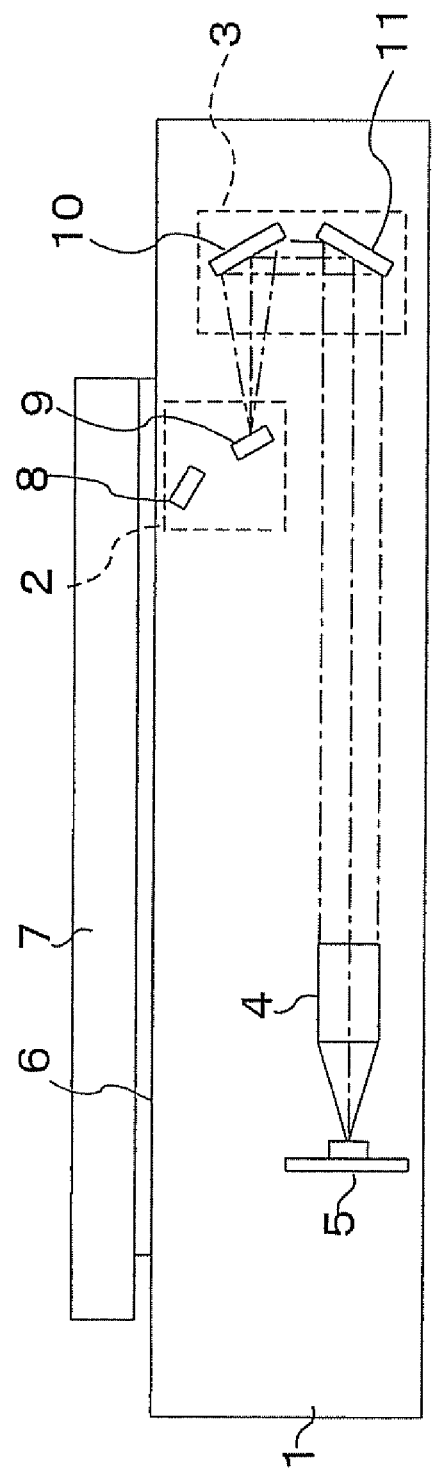
FIG. 14 is a block diagram showing an example of a structure of a mechanical system of a related art image reading apparatus.

FIG. 1 is a block diagram showing an example of a structure of a mechanical system of an image reading apparatus of an embodiment. In this drawing, the same reference numeral as that of FIG. 14 denotes the same or equivalent part to that shown in FIG. 14 and its explanation will be omitted here. In this drawing, as compared with FIG. 14, a one-dimensional image sensor device 205 is provided instead of the one-dimensional image sensor device 5.

Figure 2:
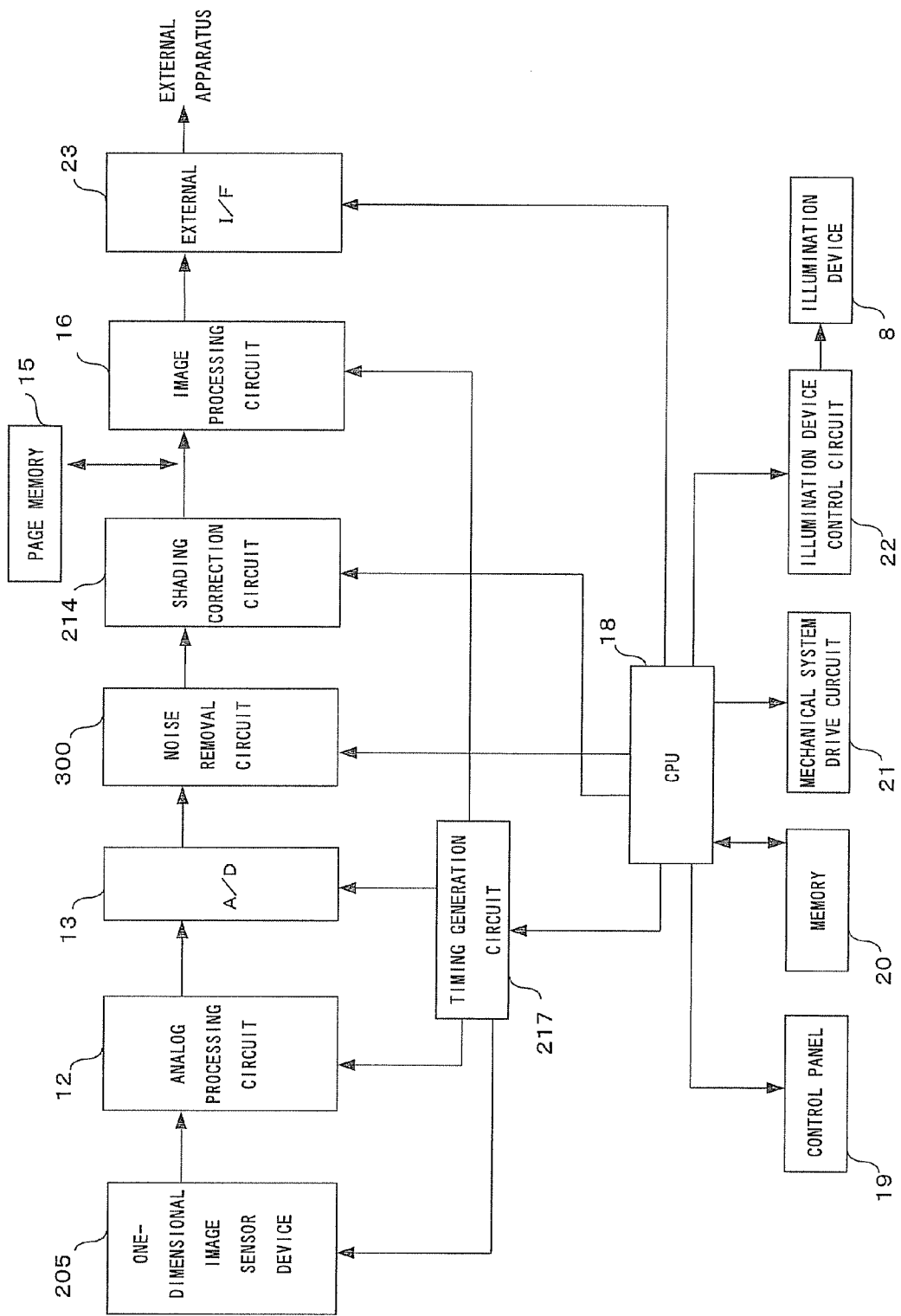
FIG. 2 is a block diagram showing an example of a structure of an electrical system of the image reading apparatus of the embodiment.
Figure 15:
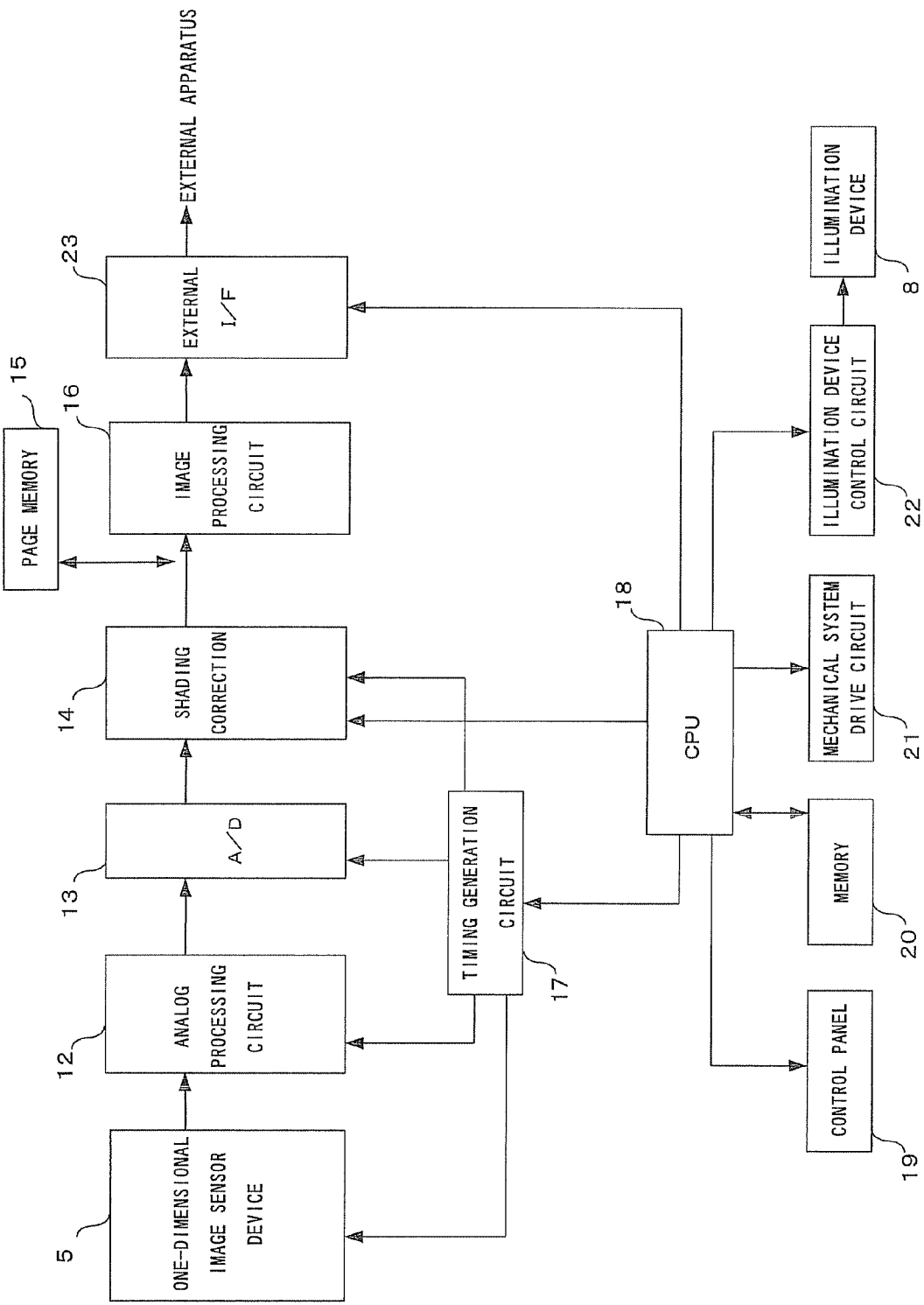
FIG. 15 is a block diagram showing an example of a structure of an electrical system of the related art image reading apparatus.
Figure 16:
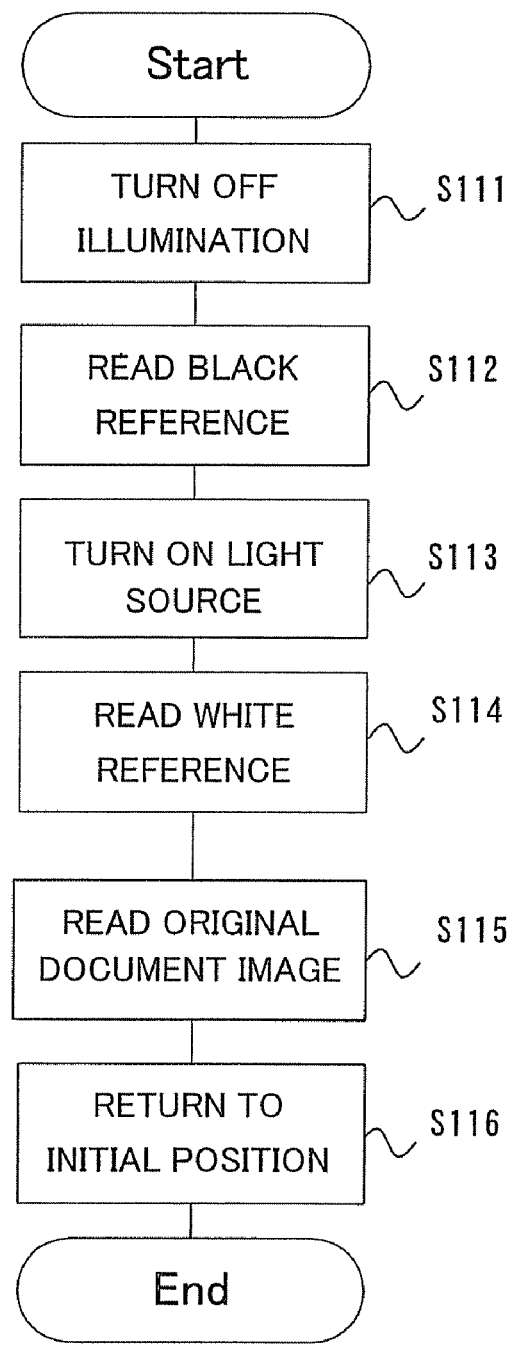
FIG. 16 is a flowchart showing an example of an operation of a related art image reading processing.
Figure 17:
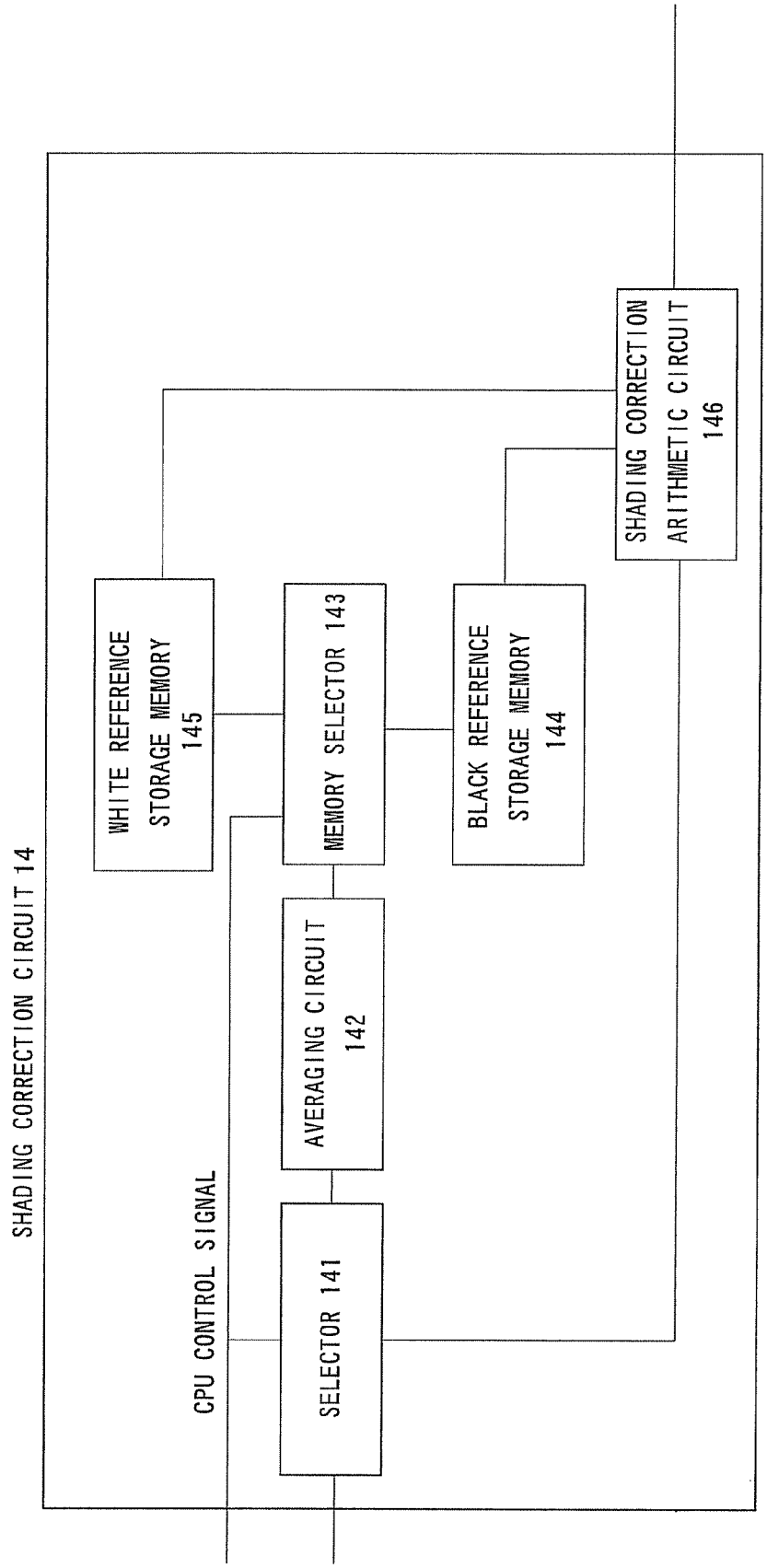
FIG. 17 is a block diagram showing an example of a structure of a related art shading correction circuit.
Figure 18:
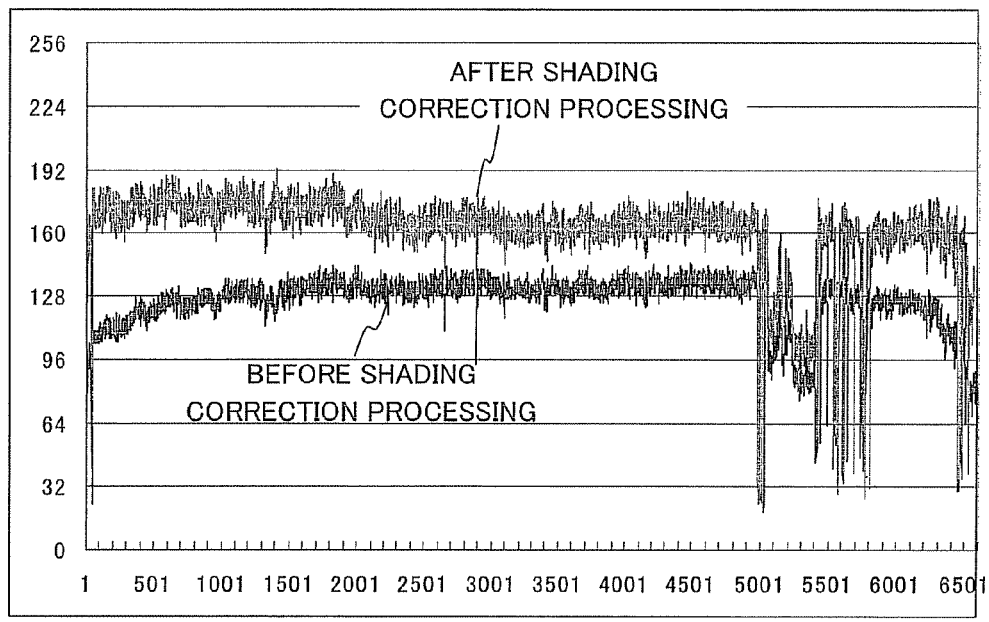
FIG. 18 is a graph showing an effect of a related art shading correction processing.

FIG. 2 is a block diagram showing an example of a structure of an electrical system of the image reading apparatus of the embodiment. In this drawing, the same reference numeral as that of FIG. 15 denotes the same or equivalent part to that shown in FIG. 15 and its explanation will be omitted here. In this drawing, as compared with FIG. 15, the one-dimensional image sensor device 205 is provided instead of the one-dimensional image sensor device 5, a timing generation circuit 217 is provided instead of the timing generation circuit 17, a shading correction circuit 214 is provided instead of the shading correction circuit 14, and a noise removal circuit 300 is newly provided between an A/D converter 13 and the shading correction circuit 214.

A CPU 18 has a role to perform various processings in the image reading apparatus, and has a role to realize various functions by executing programs stored in a memory 20. The memory 20 includes, for example, a ROM, a RAM or the like, and has a role to store various information and programs used in the image reading apparatus.

Next, the one-dimensional image sensor device 205 will be described.

Figure 3:
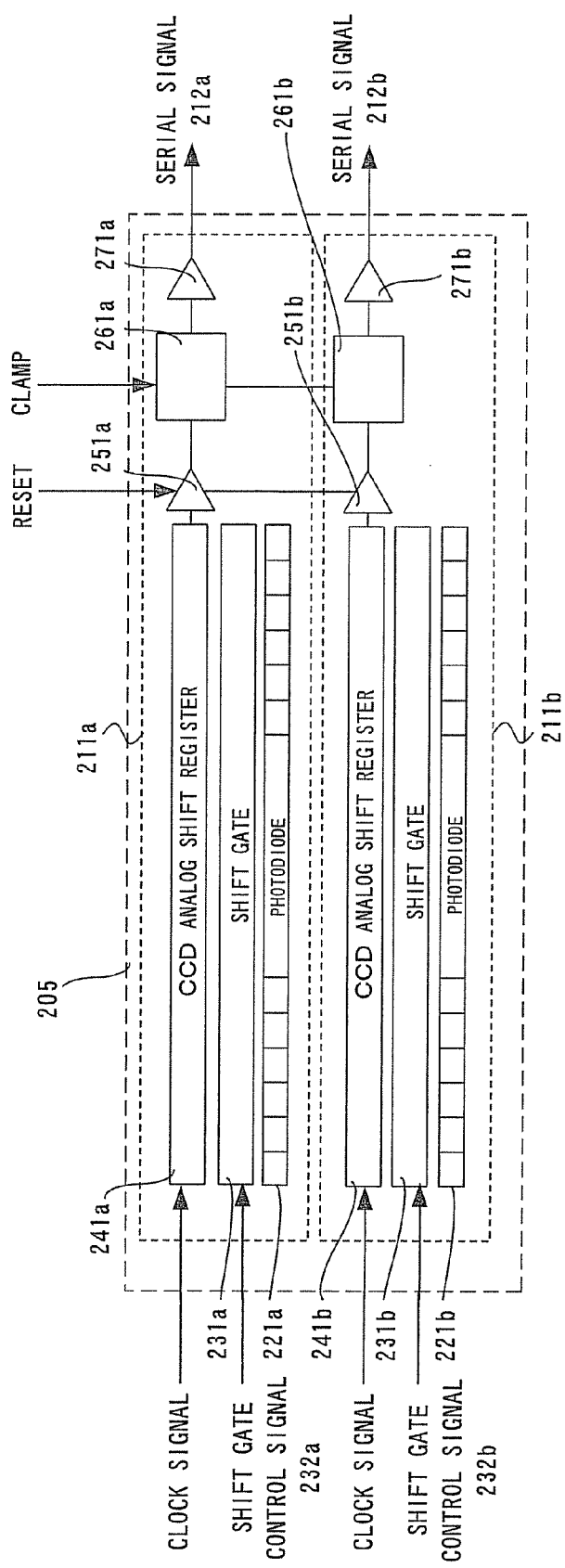
FIG. 3 is a block diagram showing an example of a structure of a one-dimensional image sensor device of the embodiment.

FIG. 3 is a block diagram showing an example of a structure of the one-dimensional image sensor device of the embodiment. The one-dimensional image sensor device 205 includes two-system sensor circuits 211a and 211b. The sensor circuit 211a includes a light receiving element (photodiode) array 221a, a shift gate 231a, a CCD (Charge Coupled Devices) analog shift register 241a, a reset gate 251a, a clamp circuit 261a, and an amplifier 271a. Similarly, the sensor circuit 211b includes a light receiving element array 221b, a shift gate 231b, a CCD analog shift register 241b, a reset gate 251b, a clamp circuit 261b, and an amplifier 271b.

Incidentally, for speeding up, the one-dimensional image sensor device 205 may be made to have such a structure that the stored electric charge of an even-number light receiving element and the stored electric charge of an odd-number light receiving element are respectively processed by different systems each including a shift gate, a CCD analog shift register, a reset gate, and a clamp circuit.

The light receiving element array 221a, 221b is such that a specified number of light receiving elements (photodiodes) are arranged on a straight line in the main scanning direction. Each of the light receiving elements stores an electric charge corresponding to the amount of received light, that is, performs the so-called photoelectric conversion, and the light reception areas of the respective light receiving elements are all equal to each other. When the shift gate 231a, 231b is brought into an open state in accordance with a shift gate control signal 232a, 232b at specified intervals given by the timing generation circuit 217, the stored electric charge of the light receiving element array 221a, 221b passes through the shift gate 231a, 231b and is shifted to the CCD analog shift register 241a, 241b.

The CCD analog shift register 241a, 241b outputs the shifted stored electric charge as a serial signal (one-dimensional image signal) to the reset gate 251a, 251b in accordance with a clock signal given by the timing generation circuit 217. The reset gate 251a, 251b is reset after a signal of a light receiving element has passed, and then, allows a signal of a next light receiving element to pass through, so that an influence is not exerted on the signal of the next light receiving element. The serial signal having passed through the reset gate 251a, 251b is clamped by the clamp circuit 261a, 261b, is amplified by the amplifier 271a, 271b, and is outputted as a serial signal 212a, 212b to an analog processing circuit 12.

Figure 4:
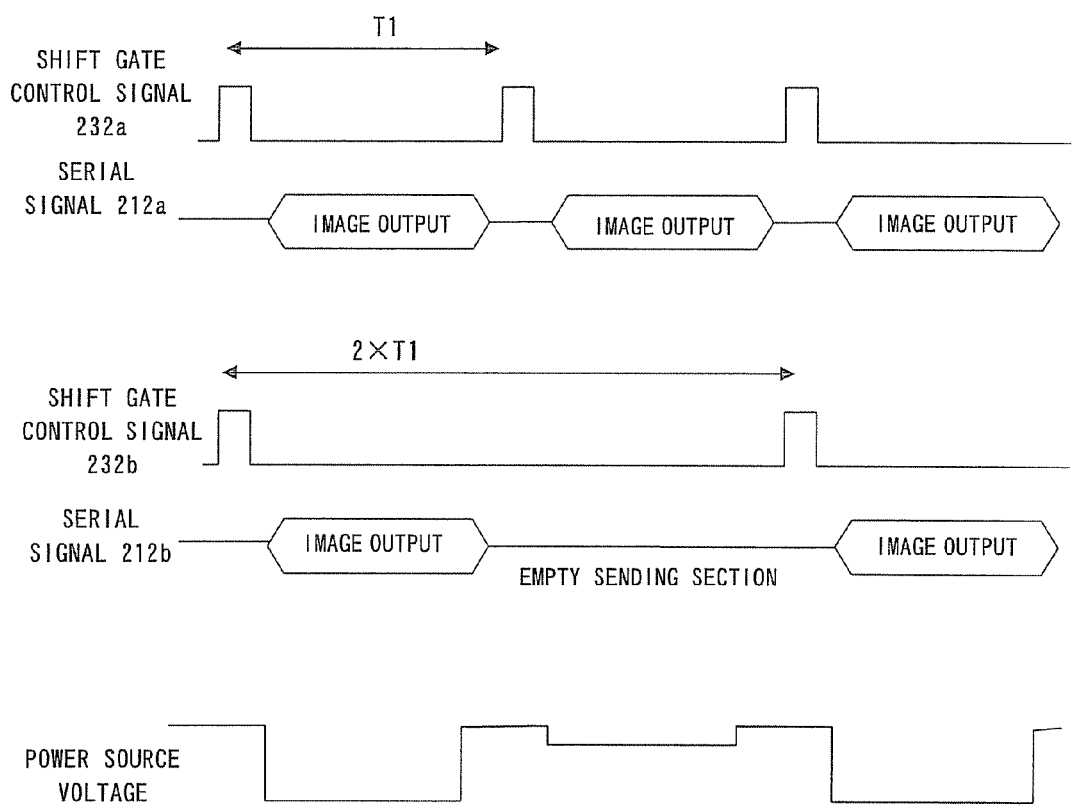
FIG. 4 is a timing chart showing an example of an operation state of the one-dimensional image sensor device of the embodiment.

FIG. 4 is a timing chart showing an example of an operation state of the one-dimensional image sensor device of the embodiment. This drawing shows, from above, the shift gate control signal 232a, the serial signal 212a, the shift gate control signal 232b, the serial signal 212b, and power source voltage waveform. The sensor circuit 211a outputs the serial signal 212a at a period T1 by the shift gate control signal 232a from the timing generation circuit 217. The sensor circuit 211b outputs the serial signal 212b at a period (2×T1) by the shift gate control signal 232b from the timing generation circuit 217. Accordingly, there occurs a case where the sensor circuits 211a and 211b simultaneously output the serial signals, and a state (empty sending state) in which only the sensor circuit 211a outputs the serial signal and the sensor circuit 211b does not output the serial signal. Besides, since the light storage time of the sensor circuit 211b is twice the light storage time of the sensor circuit 211a, the output level of the sensor circuit 211b is about twice the output level of the sensor circuit 211a.

Besides, in the case where the sensor circuit 221a, 221b operates and the serial signal 212a, 212b is outputted, there occurs a voltage drop of power supplied to the one-dimensional image sensor device 205. In the case where the invention is not applied, as the voltage drop becomes large, the level of the serial signal is lowered, and the dynamic range is lowered. Besides, a large voltage drop occurs in the case where both the sensor circuits 221a and 221b operate as compared with the case where one of the sensor circuits 221a and 221b operates. Besides, the voltage drop is proportional to the luminance of the original document image. In this embodiment, the level variation of the serial signal due to the voltage drop of the power is called cross-talk noise.

Figure 5:
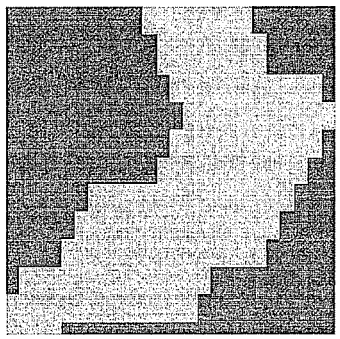
FIG. 5 is a view showing an example of an original document image and an image of a serial signal.
Figure 5:
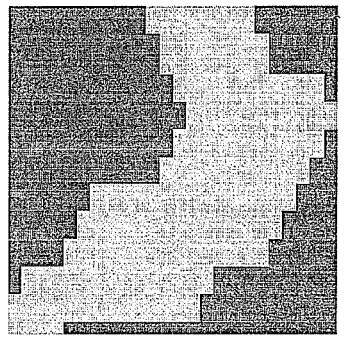
Figure 5:
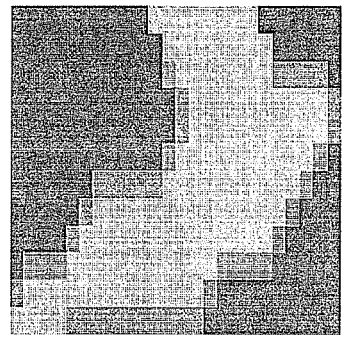
Figure 5:
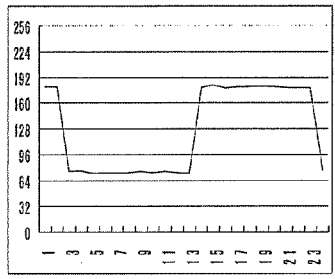
Figure 5:
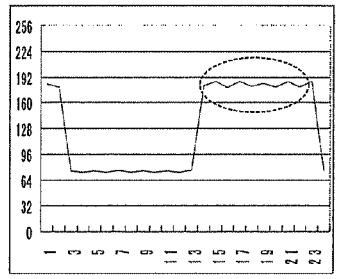
Figure 5:
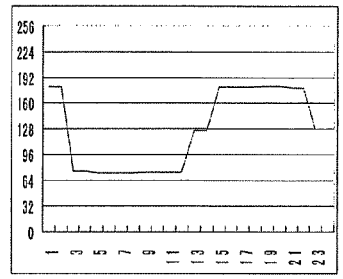

FIG. 5 is a view showing an example of an original document image and an image of a serial signal. The upper part of this drawing shows, from left, the original document image, an image A as an image of the serial signal 212a read from the original document image, and an image B as an image of the serial signal 212b read from the original document image. In all the images, the horizontal direction corresponds to the main scanning direction, and the vertical direction corresponds to the sub-scanning direction. Besides, the lower part of this drawing shows, from left, a profile of the original document image in the sub-scanning direction, a profile of the original document A in the sub-scanning direction, and a profile of the original document B in the sub-scanning direction. The profiles in the sub-scanning direction respectively correspond to the upper images, and indicate the luminance of one line of the upper image in the sub-scanning direction (vertical direction). In all the profiles, the horizontal axis indicates the pixel number in the sub-scanning direction, and the vertical axis indicates the luminance.

In the image A of this drawing, a stripe not existing in the original document image is seen in a high luminance region. Correspondingly to this, in the profile of the image A in the sub-scanning direction, variation (portion surrounded by a dotted line) of luminance is seen in the high luminance region. The stripe and the variation of the luminance are the cross-talk noise, and it is understood that even if the original document image is uniform, the variation occurs by the output state of the serial signal 212a, 212b. Besides, since the resolution of the sensor circuit 211b in the sub-scanning direction is half of that of the sensor circuit 211a, the image reproducibility is inferior to the sensor circuit 211a, however, there is no influence of the cross-talk noise.

Next, a shading correction processing in a case where the noise removal circuit 300 is not used will be described.

Figure 6:
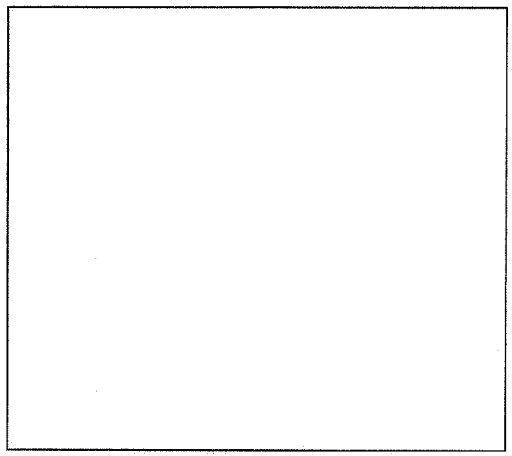
FIG. 6 is a view showing an example of white reference data and black reference data.
Figure 6:
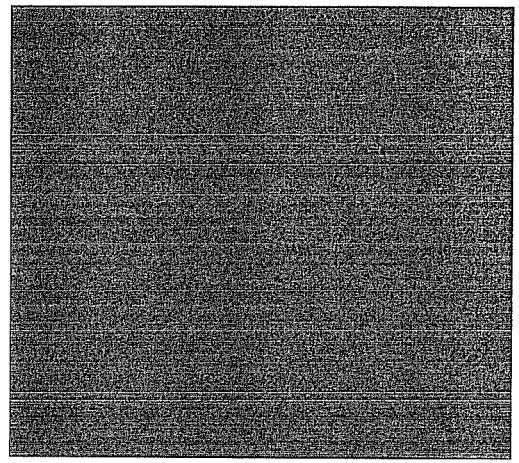
Figure 6:
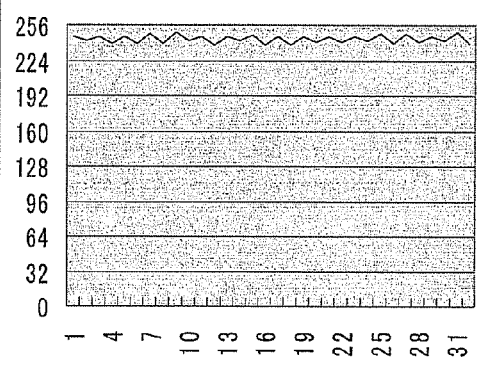
Figure 6:
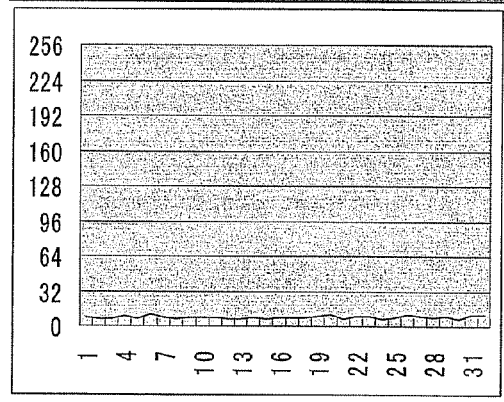

First, white reference data and black reference data are acquired from the serial signal 212a by a related art shading correction preparation processing. FIG. 6 is a view showing an example of the white reference data and the black reference data. The upper left of this drawing shows an image of the white reference data of the sensor circuit 211a, and the lower left shows a profile thereof in the sub-scanning direction. Besides, the upper right of the drawing shows an image of the black reference data of the sensor circuit 211a, and the lower right shows a profile thereof in the sub-scanning direction. In the acquisition of the white reference data and the black reference data, the serial signal 212a is averaged, so that average values of pixels influenced by the cross-talk noise and pixels not influenced are stored as the white reference data and the black reference data into the memory.

Figure 7:
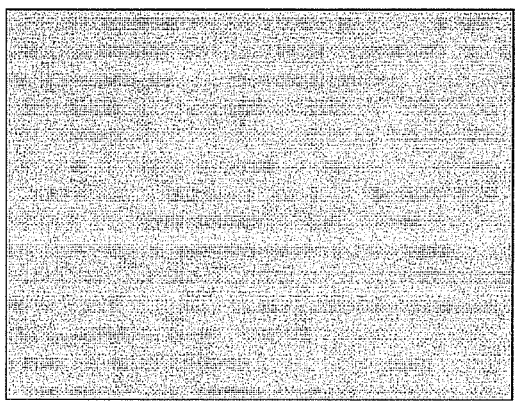
FIG. 7 is a view showing an example of an image before a shading correction processing and an image after the shading correction processing in a case where a noise removal circuit of the embodiment is not used.
Figure 7:
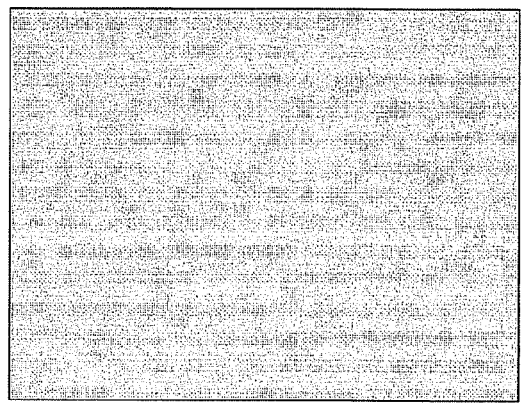
Figure 7:
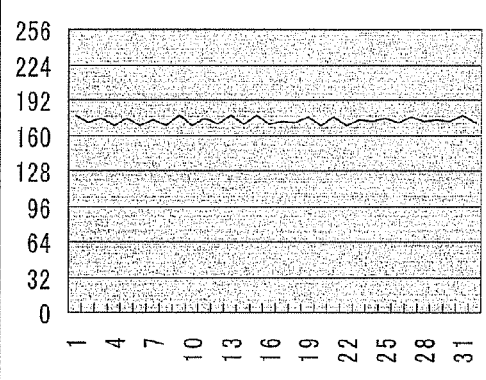
Figure 7:
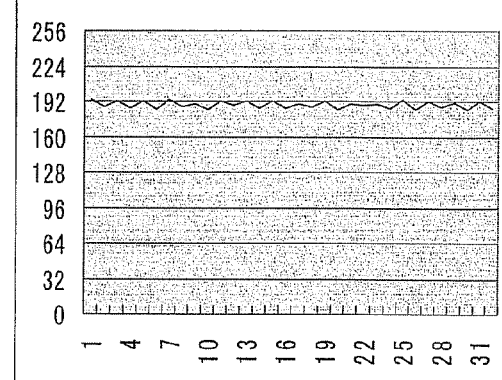

FIG. 7 is a view showing an example of an image before the shading correction processing in the case where the noise removal circuit of the embodiment is not used and an image after the shading correction processing. The upper left of the drawing shows the image before the shading correction processing, and the lower left shows a profile thereof in the sub-scanning direction. Besides, the upper right of this drawing shows the image of the black reference data after the shading correction processing, and the lower right shows a profile thereof in the sub-scanning direction. The cross-talk noise is included in the image after the related art shading correction processing and the profile in the sub-scanning direction, and image degradation occurs when only the shading correction processing is performed.

Next, the noise removal circuit 300 to remove this cross-talk noise will be described.

Figure 8:
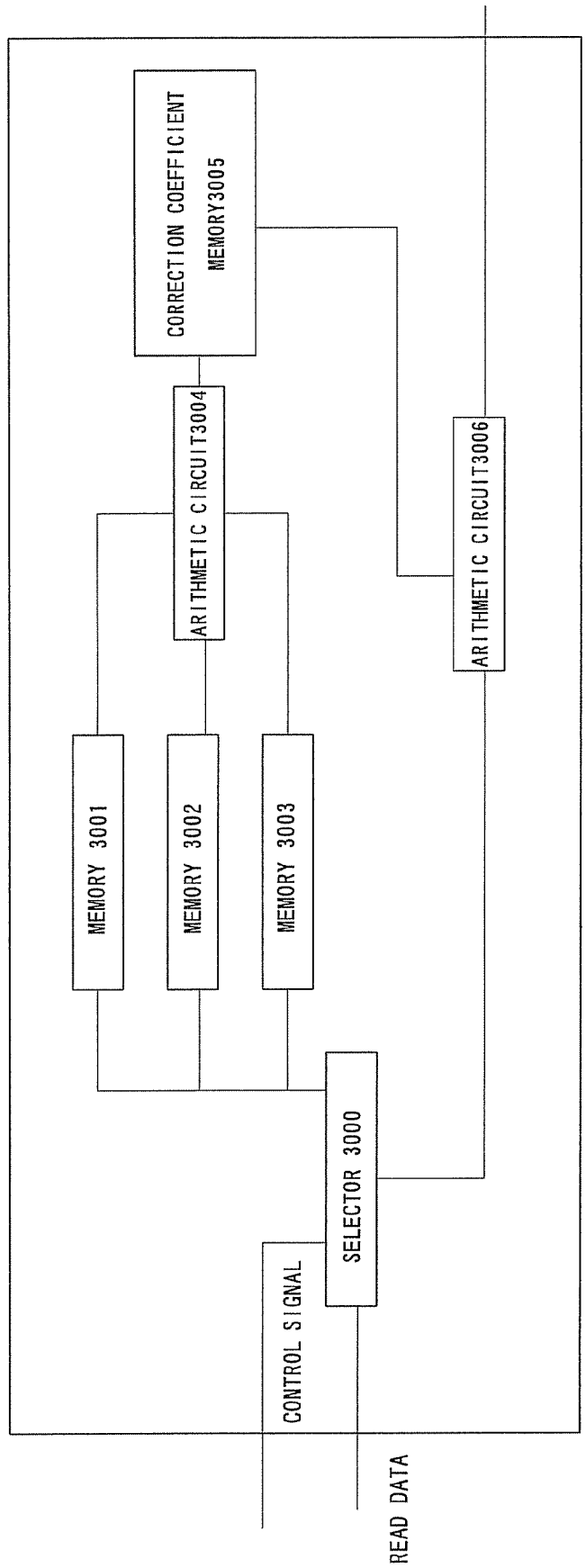
FIG. 8 is a block diagram showing an example of a structure of the noise removal circuit of the embodiment.

FIG. 8 is a block diagram showing an example of the noise removal circuit of the embodiment. The noise removal circuit 300 includes a selector 3000, memories 3001 and 3003, an arithmetic circuit 3004, a correction coefficient memory 3005, and an arithmetic circuit 3006.

Next, a noise reference data acquisition processing to acquire noise reference data used for cross-talk noise removal will be described. The noise reference data includes turning-off state read data and turning-on state read data.

Figure 9:
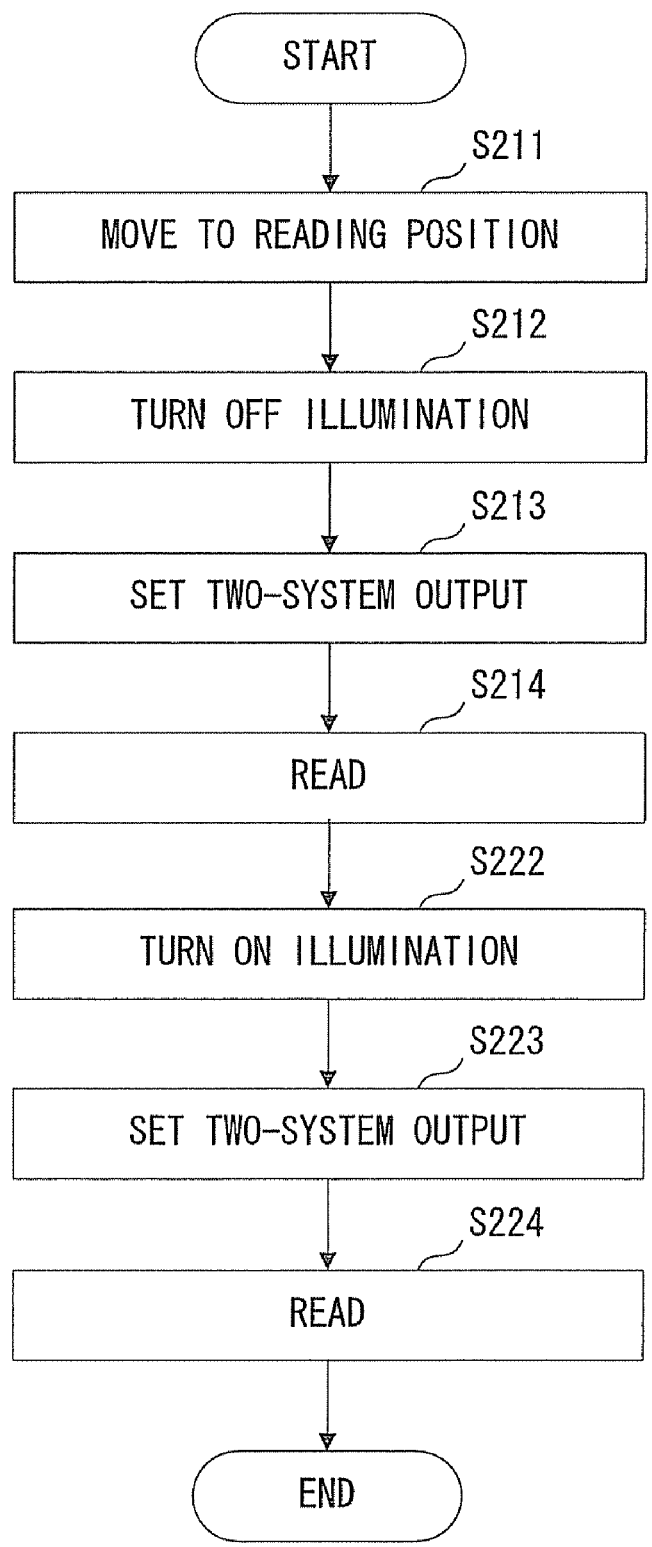
FIG. 9 is a flowchart showing an example of a noise reference data acquisition processing of the embodiment.

FIG. 9 is a flowchart showing an example of the noise reference data acquisition processing of the embodiment. First, the CPU 18 instructs the mechanical system drive circuit 21 to move a reading position to a position just under a reference plate (S211).

After it is moved to the position just under the reference plate, the CPU 18 instructs the illumination device control circuit 22 to turn off the illumination device 8 (S212). Here, the CPU 18 causes the selector 3000 to select a passage to the memory 3001 by the control signal. Next, the CPU 18 sets the one-dimensional image sensor device 205 so that both the two-system sensor circuits 211a and 211b output read data (S213)

Next, the CPU 18 causes the one-dimensional image sensor device 205 to read the reference plate, and acquires the read data in the turning-off state from both the sensor circuits 211a and 211b to obtain the turning-off state read data (S214). The read data is inputted to the noise removal circuit 300, and is stored in the memory 3001 through the selector 3000.

FIG. 10 is a block diagram showing an example of the arrangement of the read data in the memory according to the embodiment. Here, the read data of the sensor circuit 211a is made Ra, and the read data of the sensor circuit 211b is made Rb. Ra and Rb denote luminance. In this drawing, the upper part shows the arrangement of the turning-off state read data in the memory 3001. The turning-off state read data includes 16 lines. The lower part shows the arrangement of pixels of one line (Line 16) in the memory 3001. Empty sent data exists in the read data Rb from the sensor circuit 211b, and this is because as shown in the foregoing timing chart, the sub-scanning reading period is twice that of the sensor circuit 211a.

After the end of the data storage into the memory 3001, the CPU 18 causes the illumination device control circuit 22 to turn on the illumination device 8 (S222). Here, the CPU 18 causes the selector 3000 to select a passage to the memory 3003 by the control signal. Next, the CPU 18 sets the one-dimensional image sensor device 205 so that both the two-system sensor circuits 211a and 211b output the read data (S223).

Next, the CPU 18 causes the one-dimensional image sensor device 205 to read the reference plate, acquires the read data in the turning-on state from both the sensor circuits 211a and 211b to obtain the turning-on state read data (S224), and this flow is ended. The read data is inputted to the noise removal circuit 300, and is stored in the memory 3003 through the selector 3000. In the memory 3003, the turning-on state read data is arranged similarly to the turning-off state read data.

Next, a description will be given to a coefficient calculation processing to calculate, from the noise reference data (the turning-off state read data and the turning-on state read data) acquired by the noise reference data acquisition processing, a correction coefficient used for the cross-talk noise removal.

The arithmetic circuit 3004 performs the coefficient calculation processing for each pixel in the main scanning direction. A value of Ra of a pixel number n is denoted by Ra(n), and a value of Rb of a pixel number n is denoted by Rb(n).

First, the arithmetic circuit 3004 performs a processing on the turning-off state read data stored in the memory 3001.

The turning-off state read data stored in the memory 3001 is the read data in the state where both the sensor circuits 211a and 211b operate and is the read data in the state where the sensor circuit 211a receives the cross-talk noise from the sensor circuit 211b.

Besides, an odd-number line is outputted from both the sensor circuits 211a and 211b, and an even-number line is outputted from only the sensor circuit 211a. Then, a difference between the read data of an odd-number line and the read data of an even-number line stored immediately after that can be made the amount of cross-talk noise. When m is made m=1, 2, ... 8, and the value of Ra of the pixel number n of the line number k is denoted by Line(k):Ra(n), the amount of cross-talk noise is expressed by the following expression:

$$(Line(2m-1):Ra(n))-(Line(2m):Ra(n)).$$

The arithmetic circuit 3004 acquires plural line pairs from the memory 3001 to calculate the amounts of cross-talk noise, and averages the calculated plural amounts of cross-talk noise to obtain the amount of cross-talk noise DRa(n) (turning-off state noise) at the pixel number n. Here, 8 pairs of adjacent line pairs are acquired and averaging is performed.

Besides, the arithmetic circuit 3004 acquires Rb(n) of an odd-number line from the memory 3001, removes empty sent data, and averages the acquired plural Rb(n) to obtain luminance DRb(n) (turning-off state data) at the pixel number n.

Similarly, the arithmetic circuit 3004 performs a processing on the turning-on state read data stored in the memory 3003.

Besides, an odd-number line is outputted from both the sensor circuits 211a and 211b, and an even-number line is outputted from only the sensor circuit 211a. Then, a difference between the read data of an odd-number line and the read data of an even-number line stored immediately after that can be made the amount of cross-talk noise. The amount of cross-talk noise is expressed by the following expression:

$$(Line(2m-1):Ra(n))-(Line(2m):Ra(n)).$$

The arithmetic circuit 3004 acquires plural line pairs from the memory 3003 to calculate the amounts of cross-talk noise, and averages the calculated plural amounts of cross-talk noise to obtain the amount of cross-talk noise NRa(n) (turning-on state noise) at the pixel number n. Here, 8 pairs of adjacent line pairs are acquired, and averaging is performed.

Besides, the arithmetic circuit 3004 acquires Rb(n) of an odd-number line from the memory 3001, removes empty sent data, and averages the acquired plural Rb(n) to obtain luminance NRb(n) (turning-on state data) at the pixel number n. Here, 8 pairs of odd-number lines are acquired, and averaging is performed.

By this coefficient calculation processing, following data are calculated:

the amount of cross-talk noise of Ra in the turning-off state: DRa(n)

the luminance of Rb in the turning-off state: DRb(n)

the amount of cross-talk noise of Ra in the turning-on state (reference plate reading state): NRa(n)

the luminance of Rb in the turning-on state (reference plate reading state): NRb(n).

Figures 11, 12:
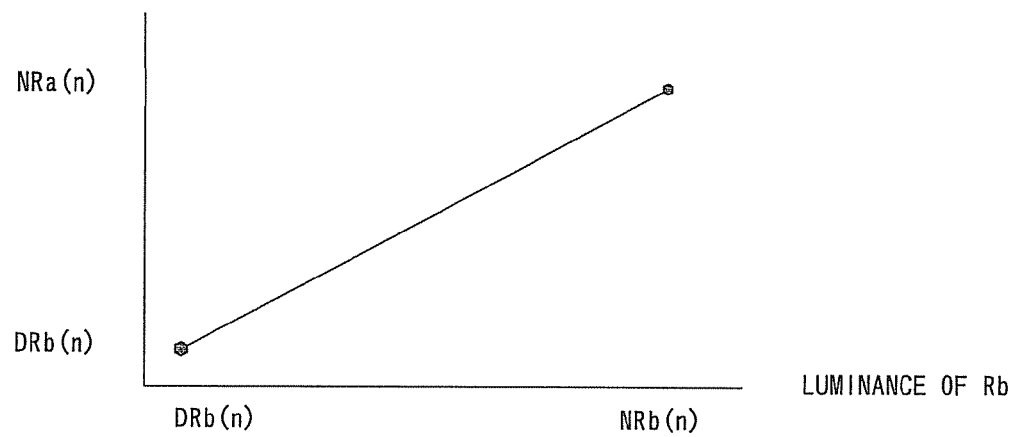
FIG. 11 is a graph showing a relation between the amount of cross-talk noise of Ra and the luminance of Rb.
FIG. 12 is an expression indicating a calculation expression of a correction coefficient.

FIG. 11 is a graph showing a relation between the amount of cross-talk noise of Ra and the luminance of Rb. In this graph, the horizontal axis indicates the luminance (reference data) of Rb, the vertical axis indicates the amount of cross-talk noise (reference noise) of Ra, and corresponding values are expressed as a straight line. Here, a point of DRb and DRa and a point of NRb and NRa are plotted. As described above, the amount of cross-talk noise of Ra is proportional to the luminance of Rb. The inclination (proportionality coefficient) of this graph is made the correction coefficient α(n) of the cross-talk noise at the pixel number n. FIG. 12 shows an expression indicating a calculation expression of the correction coefficient. According to this calculation expression, α(n) can be obtained from DRa(n), DRa(n), NRa(n), NRa(n).

The arithmetic circuit 3004 stores the value of the correction coefficient α(n) calculated by the above expression into the correction coefficient memory 3005.

Incidentally, in this embodiment, although the coefficient calculation processing is executed after all read data are stored in the memories 3001 and 3003, even if it is successively performed at the time of storage into the memories 3001 and 3003, the subsequent processing result is not changed.

Next, a noise removal processing to remove the cross-talk noise in the original document read data will be described.

At the time of reading of the original document image, the CPU 18 causes the selector 3000 to select a passage to the arithmetic circuit 3006 by the control signal. The CPU 18 causes the one-dimensional image sensor device 205 to read the original document image in this state, and performs the original document read processing to acquire the original document read data for each line. The arithmetic circuit 3006 performs the noise removal processing to remove the cross-talk noise at the pixel number n in the obtained original document read data for one line.

In the case where the values of the original document read data at the pixel number n are respectively made IRa(n) and IRb(n), the arithmetic circuit 3006 performs the following calculation on the data of Ra in which the cross-talk noise occurs, and calculates noise removal data ILRa(n) as data in which the cross-talk noise of IRa(n) is removed.

$$ILRa(n)=IRa(n)-\alpha \times IRb(n)$$

By this noise removal processing, the cross-talk noise which Ra receives from Rb can be removed from Ra.

Figure 13:
FIG. 13 is a view showing an example of an image after the shading correction processing in the case where the noise removal circuit of the embodiment is used.
Figure 13:
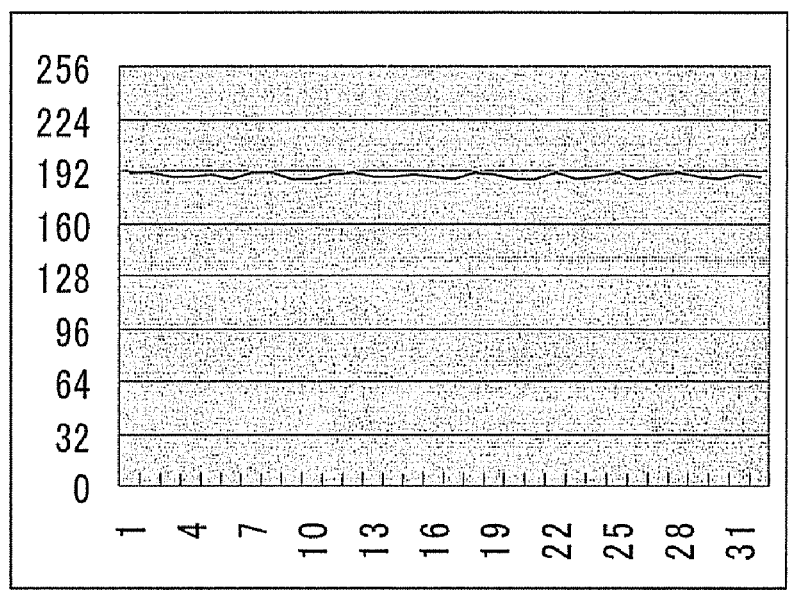

FIG. 13 is a view showing an example of an image after the shading correction processing in the case where the noise removal circuit of the embodiment is used. In this drawing, the upper part shows the image in which the noise removal processing and the shading correction processing are performed on the original document data obtained by reading a high luminance uniform original document image. The lower part shows the profile thereof in the sub-scanning direction. As shown in this image and the profile in the sub-scanning direction, the cross-talk noise is removed by the noise removal processing, and the image degradation can be prevented.

Besides, the invention can be easily applied to an image forming apparatus having an image reading function.

Incidentally, the first reading unit corresponds to the sensor circuit 211a in the embodiment. The second reading unit corresponds to the sensor circuit 211b in the embodiment. The noise calculation unit corresponds to the arithmetic circuit 3004 in the embodiment. The noise removal unit corresponds to the arithmetic circuit 3006.

Besides, the first read step corresponds to the noise reference data acquisition processing. The noise calculation generation step corresponds to the coefficient calculation processing. The second read step corresponds to the original image reading processing. The noise removal step corresponds to the noise removal processing.

The respective steps of the processing in the image reading apparatus are realized by causing the CPU 18 to execute an image reading program stored in the memory 20.

Although the description has been given to the case where the function to carry out the invention is previously recorded in the inside of the apparatus, no limitation is made to this, and the same function may be downloaded from a network to the apparatus, or the same function stored on a recording medium may be installed in the apparatus. The recording medium may have any form as long as the recording medium, such as a CD-ROM, can store a program and can be read by the apparatus. Besides, the function obtained by the previous installation or download may realize the function in cooperation with the OS (Operating System) in the inside of the apparatus.

As described above in detail, according to the invention, it becomes possible to reduce the cross-talk noise occurring in the case where plural light receiving element arrays operate at different timings, and it becomes possible to prevent image degradation.

What is claimed is:

1. An image reading apparatus comprising:
   a plurality of reading units that include a first reading unit and a second reading unit, that read a read object, output a result of reading as read data including a plurality of pixels, and respectively operate at different timings;
   a noise calculation unit that acquires first read data as a result of reading of a first read object as the read object by the plurality of reading units, acquires an operation state of the plurality of reading units during the reading of the first read object, and calculates, based on the operation state and the first read data obtained in the operation state, noise information based on the operation state, the operation state is one of a first state in which the first reading unit and the second reading unit simultaneously perform reading, and a second state in which only the first reading unit performs reading; and
   a noise removal unit that acquires second read data as a result of reading of a second read object as the read object different from the first read object by the plurality of reading units, and removes noise from the second read data based on the noise information calculated by the noise calculation unit, that acquires first state data as the first read data obtained by the first reading unit in the first state and second state data as the first read data obtained by the first reading unit in the second state, and calculates the noise in the first state data based on a difference between the first state data and the second state data to obtain the reference noise.

2. The image reading apparatus according to claim 1, wherein the operation state is information based on power consumption of the plurality of reading units.

3. The image reading apparatus according to claim 1, wherein the operation state represents a combination of whether each of the plurality of reading units performs reading.

4. The image reading apparatus according to claim 1, wherein the plurality of reading units respectively perform reading at different periods.

5. The image reading apparatus according to claim 1, wherein,
the noise calculation unit calculates relation information indicating a relation between reference data as the first read data obtained by the second reading unit and reference noise as noise in the first read data obtained by the first reading unit to obtain the noise information, and
the noise removal unit calculates, based on the second read data obtained by the second reading unit and the relation information, noise in the second read data obtained by the first reading unit and removes the noise.

6. The image reading apparatus according to claim 5, wherein the noise calculation unit calculates a proportionality coefficient of the reference noise with respect to the reference data to obtain the relation information.

7. The image reading apparatus according to claim 6, wherein the noise calculation unit calculates turning-off state noise based on the reference noise in a state where illumination to the first read object is turned off, calculates turning-off state data based on the first read data obtained by the second reading unit in the state where the illumination to the first read object is turned off, calculates turning-on state noise based on the reference noise in a state where the illumination to the first read object is turned on, calculates turning-on state data based on the first read data obtained by the second reading unit in the state where the illumination to the first read object is turned on, and calculates the proportionality coefficient based on the turning-off state noise, the second turning-off state data, the turning-on state noise and the turning-on state data.

8. The image reading apparatus according to claim 7, wherein the noise calculation unit obtains the proportionality coefficient by (turning-on state noise-turning-off state noise)/(turning-on state data-turning-off state data).

9. The image reading apparatus according to claim 5, wherein a reading period of the second reading unit is integer times as large as a reading period of the first reading unit.

10. The image reading apparatus according to claim 1, wherein
each of the plurality of reading units includes light receiving elements arranged in a line, a direction of the line is a main scanning direction, and the plurality of reading units are arranged in parallel to each other, and
the reading unit performs reading for each line, and outputs the read data for each line.

11. The image reading apparatus according to claim 10, wherein the noise calculation unit calculates differences between the first state data and the second state data for a plurality of lines, averages the differences to obtain reference noise for one line, and averages the first read data obtained by the second read unit for the plurality of lines to obtain reference data for one line.

12. An image reading method comprising:
a first read step of operating, at different timings, a plurality of reading units that include a first reading unit and a second reading unit, that read a read object and output it as read data, acquiring first read data as a result of reading of a first read object as the read object by the plurality of reading units, and acquiring an operation state of the plurality of reading units during the reading of the first read object;
a noise calculation step of calculating, based on the operation state and the first read data obtained in the operation state, noise information based on the operation state, and relation information indicating a relation between reference data as the first read data obtained by the second reading unit and reference noise as noise in the first read data obtained by the first reading unit is calculated to obtain the noise information;
a second read step of operating the plurality of reading units at different timings and acquiring second read data as a result of reading of a second read object as the read object different from the first read object by the plurality of reading units; and
a noise removal step of removing noise from the second read data based on the noise information calculated at the noise calculation step, the noise in the second read data obtained by the first reading unit is calculated based on the second read data obtained by the second reading unit and the relation information.

13. The image reading method according to claim 12, wherein the operation state is information based on power consumption of the plurality of reading units.

14. The image reading method according to claim 12, wherein at the first read step and the second read step, the plurality of reading units are respectively made to perform reading at different periods.

15. A non-transitory computer-readable storage medium comprising instructions that, in response to execution by a computer, cause the computer to execute:
a first read step of operating, at different timings, a plurality of reading units that include a first reading unit and a second reading unit, that read a read object and output it as read data, acquiring first read data as a result of reading of a first read object as the read object by the plurality of reading units, and acquiring an operation state of the plurality of reading units during the reading of the first read object;
a noise calculation step of calculating, based on the operation state and the first read data obtained in the operation state, noise information based on the operation state, and relation information indicating a relation between reference data as the first read data obtained by the second reading unit and reference noise as noise in the first read data obtained by the first reading unit is calculated to obtain the noise information;
a second read step of operating the plurality of reading units at different timings and acquiring second read data as a result of reading of a second read object as the read object different from the first read object by the plurality of reading units; and
a noise removal step of removing noise from the second read data based on the noise information calculated at the noise calculation step, the noise in the second read data obtained by the first reading unit is calculated based on the second read data obtained by the second reading unit and the relation information.

16. The non-transitory computer-readable storage medium of claim 15, wherein the operation state is information based on power consumption of the plurality of reading units.

17. The non-transitory computer-readable storage medium of claim 15, wherein at the first read step and the second read step, the plurality of reading units are respectively made to perform reading at different periods.

* * * * *